United States Patent [19]
Boyd et al.

[11] 4,235,634
[45] Nov. 25, 1980

[54] COLORED SODA-LIME GLASSWARE

[75] Inventors: David C. Boyd, Corning; Paul S. Danielson, Big Flats; Joseph Ference, Corning, all of N.Y.

[73] Assignee: Corning Glass Works, Corning, N.Y.

[21] Appl. No.: 79,276

[22] Filed: Sep. 27, 1979

[51] Int. Cl.³ .................................................. C03C 3/12
[52] U.S. Cl. .................................................. 106/52
[58] Field of Search .................................. 106/52, 54

[56] References Cited

U.S. PATENT DOCUMENTS

| | | | |
|---|---|---|---|
| 2,282,601 | 5/1942 | Blau | 106/54 |
| 4,116,704 | 9/1978 | Boyd et al. | 106/54 |

OTHER PUBLICATIONS

Weyl, W. A.-Coloured Glasses-Chapters VIII and XIII-Pub. 1951-Soc. of Glass Technology-Sheffield, Eng.

*Primary Examiner*—Helen M. McCarthy
*Attorney, Agent, or Firm*—Clinton S. Janes, Jr.

[57] ABSTRACT

This invention is drawn to the production of thermally-tempered, transparent glass articles which are integrally colored to demonstrate a particular amber-with-rose-highlights hue. More definitively, the present invention is directed to narrowly-delineated glass compositions within the general $Na_2O$-$CaO$-$SiO_2$ system having incorporated therein critically-limited amounts of NiO and $MnO_2$ as colorants.

1 Claim, 1 Drawing Figure

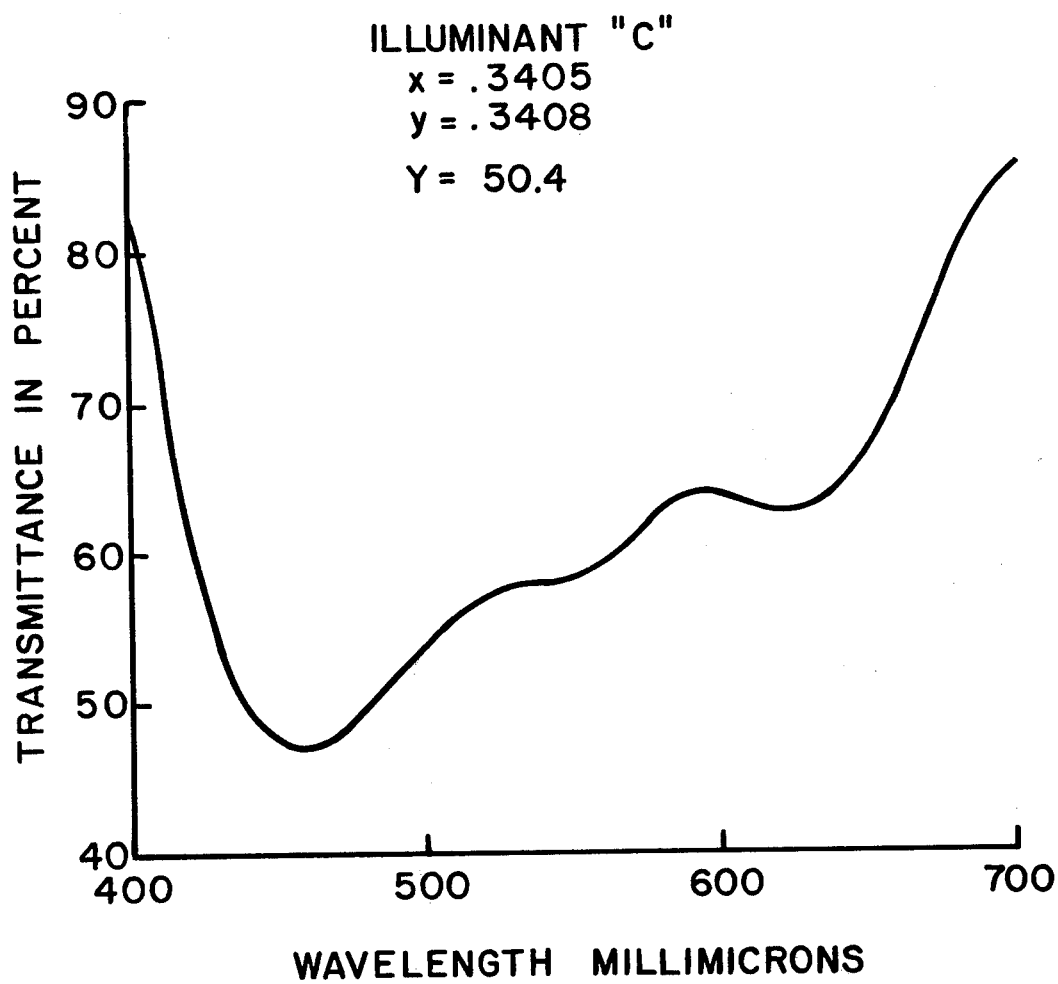

COLORED SODA-LIME GLASSWARE

BACKGROUND OF THE INVENTION

Culinary ware produced from thermally-tempered glasses having compositions within the general soda-lime-silica field is well-known to the art. Because the coefficient of thermal expansion of soda lime glasses is relatively high, their use in cooking ware requires such articles to be thermally tempered to substantially enhance their mechanical strength and, in so doing, improve the thermal shock resistance thereof.

The incorporation of inorganic colorants into glass batches to impart an integral coloration therein has been long practiced in the glass art. A history of the use of colorants in glass plus an explanation of various reaction mechanisms involved in the development of colors therein can be found in *Coloured Glasses,* Woldemar A. Weyl, Dawson's of Pall Mall, London, 1959.

Consumer purchasing of culinary and dinnerware is frequently greatly influenced by the aesthetic appearance of the ware, with color being one of the most potent factors affecting such purchasing. The consumer market for plants and plant growing supplies and accessories is a large and presently rapidly expanding business. Studies have indicated that glass containers perform as well as, and in some instances better than, ceramic or plastic containers for growing plants. In like manner to food service ware, the purchase of flowerpots can be strongly influenced by the appearance thereof.

Extensive opinion testing of consumers, utilizing target samples prepared by applying clear tinted lacquers of various colors and shades on transparent glass bodies, resulted in a particular brownish tint being deemed the most attractive by a significant majority of the persons interviewed. Coincidentally, this color is quite similar to a commercially-marketed line of culinary ware prepared from borosilicate glass compositions. This circumstance presented the economically advantageous challenge to duplicate the color of the borosilicate glasses in a soda-lime composition, generally a very difficult objective to accomplish, in order to provide complementary product lines.

Research was then undertaken to devise glass compositions in the soda-lime-silica system which, when thermally tempered for improved mechanical strength and thermal shock resistance, would visually match the color and transmittance of the target samples. Such glasses could be useful in numerous applications, particularly in food service ware and containers for growing plants. Transmittance measurements of the desired product yielded a curve having a configuration such as that appearing in the appended drawing. Visually, the color of the glass can be described as an amber-with-rose-highlights hue.

SUMMARY OF THE INVENTION

Transparent glasses exhibiting a transmittance curve approximating that depicted in the appended drawing can be produced from compositions in the general soda-lime-silica glass field falling within the strictly-defined limits set out below. Hence, the operable glasses will consists essentially, expressed in weight percent on the oxide basis as calculated from the batch, of about:

| | |
|---|---|
| $Na_2O$ | $13.45 \pm 0.15$ |
| $CaO$ | $9.6 \pm 0.15$ |
| $Al_2O_3$ | $1.65 \pm 0.1$ |
| $As_2O_3$ | $0.3 \pm 0.02$ |
| $NiO$ | $0.04 \pm 0.002$ |
| $MnO_2$ | $0.48 \pm 0.08$ |
| $SiO_2$ | Remainder |

Arsenic performs its conventional function as a fining agent. Iron is preferably totally absent from the composition and 0.025% is the maximum that can be tolerated since it profoundly affects the oxidation state of the glass.

The $Ni^{+2}$ ion can be present in a glass structure in either a four-fold or six-fold coordination. The $Ni^{+2}$ ion in the four-fold configuration imparts a purple coloration to the glass. In contrast, $Ni^{+2}$ ion in the six-fold coordination yield a yellow coloration. It is believed self-evident, therefore, that the coordination state of the $Ni^{+2}$ ion is a vital element in the development of the desired tint in the glass.

Moreover, experience has shown that any thermal treatment to which a $Ni^{+2}$ ion-containing glass is exposed modifies the coordination state adopted by the $Ni^{+2}$ ions and, following therefrom, the coloration produced within the glass. As illustrative of that phenomenon, it has been learned that when glass articles having similar compositions are annealed, i.e., the bodies shaped from the molten batch are cooled relatively slowly to room temperature, the $Ni^{+2}$ ions appear to assume a six-fold coordination and, consquently, develop a yellowish coloration within the glass. However, when like compositions are cooled relatively quickly from the molten condition to room temperature, some of the $Ni^{+2}$ ions appear to adopt a four-fold coordinatin thereby tending to produce a purple coloration which, when combined with the yellowish coloration of the $Ni^{+2}$ ions in six-fold coordination, results in the development of an overall neutral gray coloration in the glass.

A like situation exists when a $Ni^{+2}$ ion-containing glass article is thermally tempered, i.e., when a glass article is raised in temperature to the vicinity of the softening point of the glass and then quickly chilled to room temperature. Hence, it would seem that $Ni^{+2}$ ions are prone to adopt a four-fold coordination when the glass body is at high temperatures and rapid cooling of the body during the chilling step does not provide adequate time for conversion of the high temperature state of the $Ni^{+2}$ ions to the low-temperature, six-fold coordination.

This variation of coordination states with temperature is of great practical significance to the glass manufacturer involved, as here, with the production of glass articles requiring thermal tempering. Thus, the final color exhibited by such articles is that present only after the articles have been subjected to the thermal tempering treatment.

The oxidation state of the glass is likewise of extreme importance in achieving the necessary balance of $Mn^{+2}$ ions and $Mn^{+3}$ ions in the glass. ($Mn^{+2}$ ions impart a weak yellow or brownish cast to the glass whereas $Mn^{+3}$ ions confer a strong purple coloration.) Consequently, mildly oxidizing melting conditions are desirable for the batch such that sufficient $Mn^{+3}$ ions will be produced to provide a pink coloration. This pink coloration gives rise to the rose highlights in the amber coloration. The necessary oxidizing environment can be readily secured by utilizing nitrates, e.g., NaNO$_3$, or other oxidizing agents as part of the batch materials. Such practice is well known to the glass technologist.

BRIEF DESCRIPTION OF THE DRAWING

The appended drawing comprises a spectral transmittance curve exhibited by polished plates of the inventive composition.

Prior Art

U.S. Pat. No. 4,116,704 discloses the manufacture of glasses having compositions of closely-delimited ranges within the Na$_2$O-Al$_2$O$_3$-B$_2$O$_3$-SiO$_2$ field which are provided with an integral gray-brown coloration via the inclusion of Co$_3$O$_4$, NiO, and MnO$_2$ in the batches therefor. Several United States patents and a technical publication were cited as references during the prosecution of that patent. Those references may also be pertinent as prior art in the instant application, although the base compositions thereof are directed to the borosilicate composition, rather than the soda-lime composition, field.

DESCRIPTION OF THE PREFERRED EMBODIMENTS

A glass-forming batch having the approximate composition tabulated below, expressed in weight percent on the oxide basis as calculated from the batch, was compounded. The actual batch ingredients may consist of any materials, either the oxides or other compounds, which, when melted together, will be converted into the desired oxide in the proper proportions.

| | |
|---|---|
| SiO$_2$ | 74.48 |
| Na$_2$O | 13.45 |
| Al$_2$O$_3$ | 1.65 |
| CaO | 9.6 |
| As$_2$O$_3$ | 0.3 |
| NiO | 0.04 |
| MnO$_2$ | 0.48 |

The batch ingredients were ballmilled together for about one hour to aid in obtaining a homogeneous melt and then dispensed into a silica crucible. After covering, the crucible was introduced into an electrically-heated furnace operating at 1425° C. and the batch melted for six hours. Thereafter, sheet having a thickness of about 10 mm was rolled from the melt and immediately transferred to an annealer operating at 550° C. Square samples of about 2" were cut therefrom and then ground and polished to a thickness of about 6 mm, thereby rendering them suitable for transmittance measurements. Each square was subsequently thermally tempered by being chilled to room temperature in an air blast after being exposed for five minutes at 650° C.

The appended drawing represents the spectral transmittance curve demonstrated by the polished plates as generated by a General Electric Company Recording Spectrophotometer No. 732983. The chromaticity values of x, y, and Y, as determined on the glass utilizing Illuminate C, are also recorded on the drawing. Visually, the samples appeared to display a soft yellow-brown (amber), coloration with reddish (rose) highlights.

As was observed above, the composition of the glass is extremely critical to achieve the desired color and transmittance. Therefore, components outside of those specifically recited will preferably be entirely absent.

Finally, whereas the above description reflected laboratory scale melting and forming only, it will be appreciated that the recited composition would be equally operable in commercial glass melting and forming equipment.

We claim:

1. A transparent glass exhibiting an amber-with-rose-highlights hue and demonstrating a spectral transmittance curve approximating that depicted in the appended drawing consisting essentially, expressed in weight percent on the oxide basis is calculated from the batch, of about:

| | |
|---|---|
| Na$_2$O | 13.45 ± 0.15 |
| CaO | 9.6 ± 0.15 |
| Al$_2$O$_3$ | 1.65 ± 0.1 |
| As$_2$O$_3$ | 0.3 ± 0.02 |
| NiO | 0.04 ± 0.002 |
| MnO$_2$ | 0.48 ± 0.08 |
| SiO$_2$ | Remainder |

\* \* \* \* \*